June 24, 1952
W. C. STAMMER ET AL
2,601,642
METHOD AND APPARATUS FOR REGULATING
THE SIZE AND FORM OF SOLDER PELLETS
Filed Feb. 7, 1950
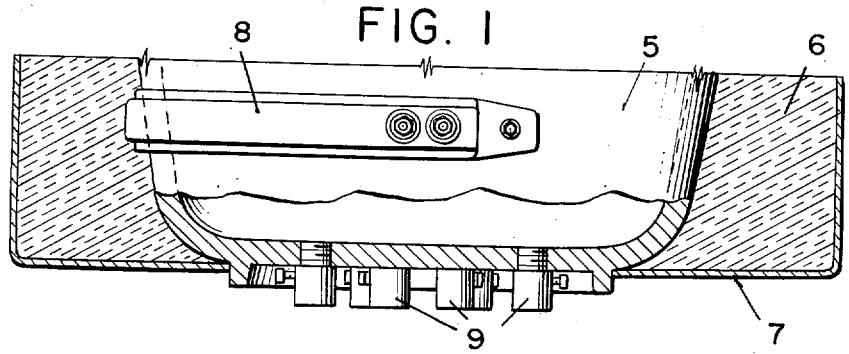
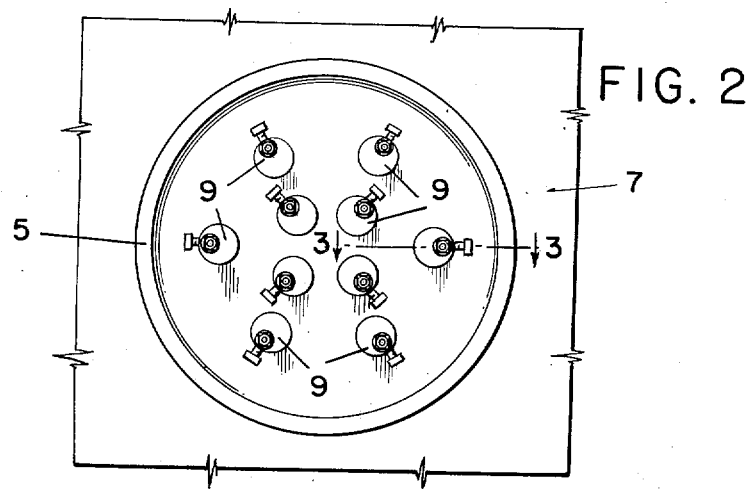
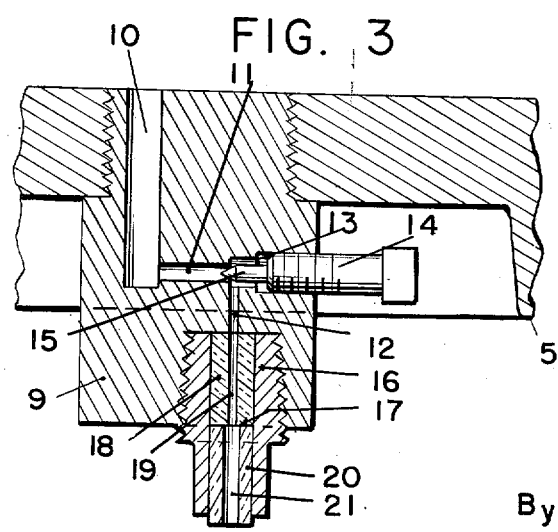
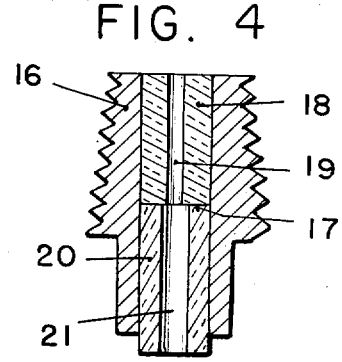
Inventors:
William C. Stammer,
Calvin R. Breden,
By Mason, Porter, Miller & Stewart
Attorneys Patented June 24, 1952

2,601,642

UNITED STATES PATENT OFFICE 2,601,642

METHOD AND APPARATUS FOR REGULATING THE SIZE AND FORM OF SOLDER PELLETS

William C. Stammer, Glenview, and Calvin R. Breden, La Grange, Ill., assignors to Continental Can Company, Inc., New York, N. Y., a corporation of New York Application February 7, 1950, Serial No. 142,812

7 Claims. (Cl. 18—2.4)

The specification which follows relates to a novel method and apparatus for making solder pellets. Such pellets have found extensive use and are quite advantageous for soldering metal seams and junctures in narrow or restricted places where it is difficult to control the application of limited amounts of molten solder or drop solder which is usually cut from wire solder and whose sharp edges and cylindrical shape make mechanical feeds uncertain and rolling erratic. By providing solder in pellet form, the desired number and size of pellets required for the soldering operation can be taken and delivered to the place where the soldering is to be done. The pellets may be rolled or shaken into final position after which moderate heating of the metal parts will melt the pellets and cause them to flow directly into the seam. Small valves, fittings or closures are thus effectively assembled in the ends of metal containers.

In our co-pending application for Letters Patent on a Method and Apparatus of Forming Solder Pellets, filed May 5, 1948, Serial Number 25,216, Patent No. 2,574,357 November 6, 1951, we have pointed out that the production of such solder pellets has, however, presented numerous difficulties. Forming them by casting is slow and expensive. Solder has never been made successfully in pellet form or shot by dropping through a cooling medium such as air or water. While this method is satisfactory with lead and isothermal lead alloys in general, the presence of as little as .01% of tin has been found to prevent the formation of round shot. In like manner, the presence of tin serves to reduce the surface tension of the molten mass and to promote a wetting of the metal surface with which it comes in contact. These characteristics are well described in the patent of Olin and Smith, dated April 5, 1938, No. 2,113,279, for a Process for the Manufacture of Shot.

In a word, in forming lead shot the preferred practice is to increase the hardness by the addition of a minor proportion of arsenic or antimony. The lead and its alloys used for shot have a relatively short range of congelation. This is materially above that of solder. On the contrary, it is a well-known fact that tin-lead solder alloys melt at materially lower temperatures than do the lead alloys used for lead shot. Consequently, the production of solder pellets must be carried out at much lower temperatures and solidification may occur over a wider range. One result of this is a tendency for the constituent ingredients of solder to crystallize separately and thus interfere with the formation of acceptable homogeneous pellets.

We have succeeded in forming satisfactory pellets of solders containing tin combined with other metals such as lead or silver, in a wide range of proportions. By pellets we refer to spheroidal masses of generally uniform weight and capable of being handled in measured quantities and rolled or shaken into small crevices, such as metal seams or junctures preliminary to fusion. By our method, pellets are produced which are uniform in size, 85% being within the allowed tolerances. This result is in part obtained by special precautions taken to prevent the wetting of contact surfaces by the molten drops during their formation.

The form is generally spheroidal and can permit their ready placement in the restricted area intended to be soldered.

It is characteristic of these pellets that the surface is clean and unoxidized and the component ingredients are not segregated when congealed.

In our co-pending application above referred to, we have disclosed a method and apparatus for controlling the form and size of the molten drops of solder and the rate of congelation to produce approximately homogeneous spheroidal pellets.

It is a purpose of the present invention to control the production and discharge of the drops of molten solder by an improved method.

It is a further object of the invention to provide novel means by which the method is carried out.

Specifically we have found that a delivery tube for the molten solder when constructed with a passageway with two zones, the subsequent one of greater diameter than its antecedent, will greatly facilitate the production of uniform drops and spheroidal form when congealed.

There is, therefore, the further object of our invention to cause the molten solder to discharge at a metered rate with minimum adherence to the passageway traversed.

Another and related object of the invention is to provide an improved eduction tube for the discharge of the molten solder. This tube is of glass or similar ceramic material capable of withstanding the heat of the molten solder and formed in two sections, the diameters of which increase from top to bottom. This material reduces the tendency of the solder to wet the walls of the tube. The progressively increasing inner diameter of the tube still further promotes the separation of the drop from the tube.

These and other purposes and advantages of the invention will be apparent from the accompanying drawings illustrating by way of example our preferred mode of carrying out the invention.

In the drawings:

Fig. 1 is a fragmentary side elevation, partly in vertical section of the solder melting crucible or melting pot;

Fig. 2 is a bottom plan view of the pot;

Fig. 3 is an enlarged vertical section of one of the discharge nozzles taken on the line 3—3 of Fig. 2 and Fig. 4 is a vertical axial cross-section of the nozzle unit showing the improved eduction tube.

The improved method is carried out by regulated fall of drops of molten solder from a melting pot into a cooling medium which may be a liquid of the desired characteristics. We have shown such a melting pot 5 set in a mass of insulating material 6 in a supporting shell 7. Electrical heating elements 8 imbedded in the insulation 6 surround the pot 5 and raise it to a temperature which will maintain the solder in the desired molten condition.

The bottom of the pot 5 has a series of plugs 9 which are screw-threaded vertically in the bottom. Each plug has a vertical passageway 10 connected by a lateral passageway 11 to a vertical discharge passageway 12. The plugs are bored laterally in line with the passageways 11 to produce enlarged bores 13. Each bore carries a screw-threaded shank 14 of a needle valve 15. The needle valve 15 registers with the passageway 11 and can be adjusted to meter the discharge from the latter or to shut off the flow of solder entirely to permit renewal of the discharge nipple.

A threaded nipple 16 is fitted to the base of each plug 9 and projects below the latter. Axially the nipple 16 carries an eduction tube 17. This tube is cemented or otherwise fastened in the nipple 16. The tube 17 has an upper section 18 of glass or other ceramic material which is resistant to the temperatures to which it is subjected. Pyrex glass is an example of a suitable material.

The section 18 has a vertical central passageway 19 through which the molten solder is discharged at a predetermined rate from the needle valve 15. Due to the nature of the material used, the wall of the passageway 19 is not "wet" by the molten solder and there is a minimum of frictional resistance or skin effect.

The tube 17 also has a lower section 20 into which the passageway 19 leads. The lower section 20 is made of the same material as the upper section 19. However, it is provided with a vertical central passageway 21 which is of larger diameter than the passageway 19.

The size of the lower passageway, is relatively larger than the upper passageway 19. In case the upper passageway has a bore or diameter of 0.75 millimeters, the bore of the lower section is preferably 1.10 millimeters. The ratio is thus approximately 2 to 3. Such a ratio has the desired effect of causing the drops to form in the tube away from disturbing conditions of air or gas. The diameter of the pellet as formed is approximately 3.2 millimeters. Thus a function of the increased diameter of the lower passageway is to determine the size of the pellet, roughly three times the diameter of the passageway. The molten solder collects in the lower tube until its accumulating weight overcomes the surface tension of the mass and it drops from the end of the tube through a short space into the cooling medium where it congeals into a spheriodal form.

The subsequent congelation of the drops results in pellets which are more nearly spherical. The final solidification occurs during a free fall in a quenching bath of cooling liquid.

This example illustrates the improved method of forming pellets of approximately spheroidal form and uniform size.

The device as designed is an important factor in attaining these results and is consequently a material part of the invention.

While the preferred form has been illustrated and described, the invention may be carried out with considerable latitude in materials and proportions within the scope of the appended claims.

What we claim is:

1. The method of regulating the production of solder pellets by dropping molten solder freely in a continuous stream of predetermined cross-section through a passageway having a minimum wetting attraction for the solder and causing the stream to widen to greater cross-section at a point above its discharge.

2. In combination a melting pot, a plurality of discharge plugs in the base of the pot, and eduction tube in each plug, said tube being formed of material having a minimum of wetting attraction for the molten solder and formed in two successive sections, the upper section having a bore through which the falling solder stream will be metered and the lower section being of relatively greater bore reducing the rate of travel of the stream therethrough.

3. In combination a melting pot, a plurality of discharge plugs in the base of the pot, an eduction tube in each plug, said tube being formed of material having a minimum of wetting attraction for the molten solder and formed in two successive sections, the upper section having a bore through which the falling solder stream will be metered and the lower section being of relatively greater bore and axially aligned with the upper section.

4. In combination a melting pot, a plurality of discharge plugs in the base of the pot, an eduction tube in each plug, said tube being formed of material having a minimum of wetting attraction for the molten solder and formed in two successive sections the upper section having a bore through which the falling solder stream will be metered and the lower section having a relatively greater bore abruptly set back from the edge of the bore in the upper section.

5. A discharge plug for detachable connection with a solder-melting pot, said plug having a discharge nipple with a central vertical opening, a sectional eduction tube fitted in the opening, the upper section of the tube having a central bore, and the lower section of the tube having a relatively larger bore directly beneath the bore of the upper section.

6. A discharge plug for detachable connection with a solder-melting pot, said plug having a discharge nipple with a central vertical opening, a sectional ceramic eduction tube fitted in the opening, the upper section of the tube having a central bore, and the lower section of the tube having a relatively larger bore directly aligned beneath the bore of the upper section.

7. A discharge plug for detachable connection with a solder-melting pot, said plug having a discharge nipple with a central vertical opening, a sectional eduction tube fitted in the opening, the upper section of the tube having a central bore, and the lower section of the tube having a bore approximately half again as wide as the bore in the upper section.

WILLIAM C. STAMMER.
CALVIN R. BREDEN.

REFERENCES CITED

The following references are of record in the file of this patent:

UNITED STATES PATENTS

| Number | Name | Date |
| --- | --- | --- |
| 1,637,377 | Heicke | Aug. 2, 1927 |
| 1,834,687 | Davis | Dec. 1, 1931 |